United States Patent [19]

Miyairi et al.

[11] Patent Number: 4,754,642

[45] Date of Patent: Jul. 5, 1988

[54] HIGH TEMPERATURE FLUID FLOW SPEED DETECTION APPARATUS

[75] Inventors: Makoto Miyairi, Musashino; Toshinobu Itoh, Kamakura, both of Japan

[73] Assignee: Sekiyu Shigen Kaihatsu Kabushiki Kaisha, Tokyo, Japan

[21] Appl. No.: 892,992

[22] Filed: Aug. 4, 1986

[30] Foreign Application Priority Data

Aug. 20, 1985 [JP] Japan ................. 60-181110

[51] Int. Cl.⁴ .............................................. E21B 47/10
[52] U.S. Cl. .................................... 73/155; 73/861.78; 324/173
[58] Field of Search ................ 73/155, 861.77, 861.78; 324/173, 174

[56] References Cited

U.S. PATENT DOCUMENTS 2,962,895 12/1960 Rumble ................................. 73/155
3,455,162 7/1969 Michener et al. ................. 73/861.78
3,932,813 1/1976 Gallant ......................... 73/861.78 X
4,088,022 5/1978 Kalotay .............................. 73/861.78
4,345,480 8/1982 Basham et al. ..................... 73/861.77
4,404,860 9/1983 Wood et al. ....................... 73/861.78
4,566,317 1/1986 Skakra ................................... 73/155

Primary Examiner—Stewart J. Levy
Assistant Examiner—Kevin D. O'Shea
Attorney, Agent, or Firm—George B. Oujevolk

[57] ABSTRACT

A speed detection apparatus intended to be placed in a borehole containing high temperature flowing fluid consists of an elongated casing with a rotary shaft having a helical rotary blade in the casing. Secured to the rotary shaft is a sensor control rotor with a plurality of metal targets on the periphery. Opposed to these targets is an eddy currents displacement transducer with electric circuitry including a coil. The displacement of the targets due to fluid flow causes impedance change in the coil which produces an electrical signal proportional to the rate of flow.

3 Claims, 9 Drawing Sheets

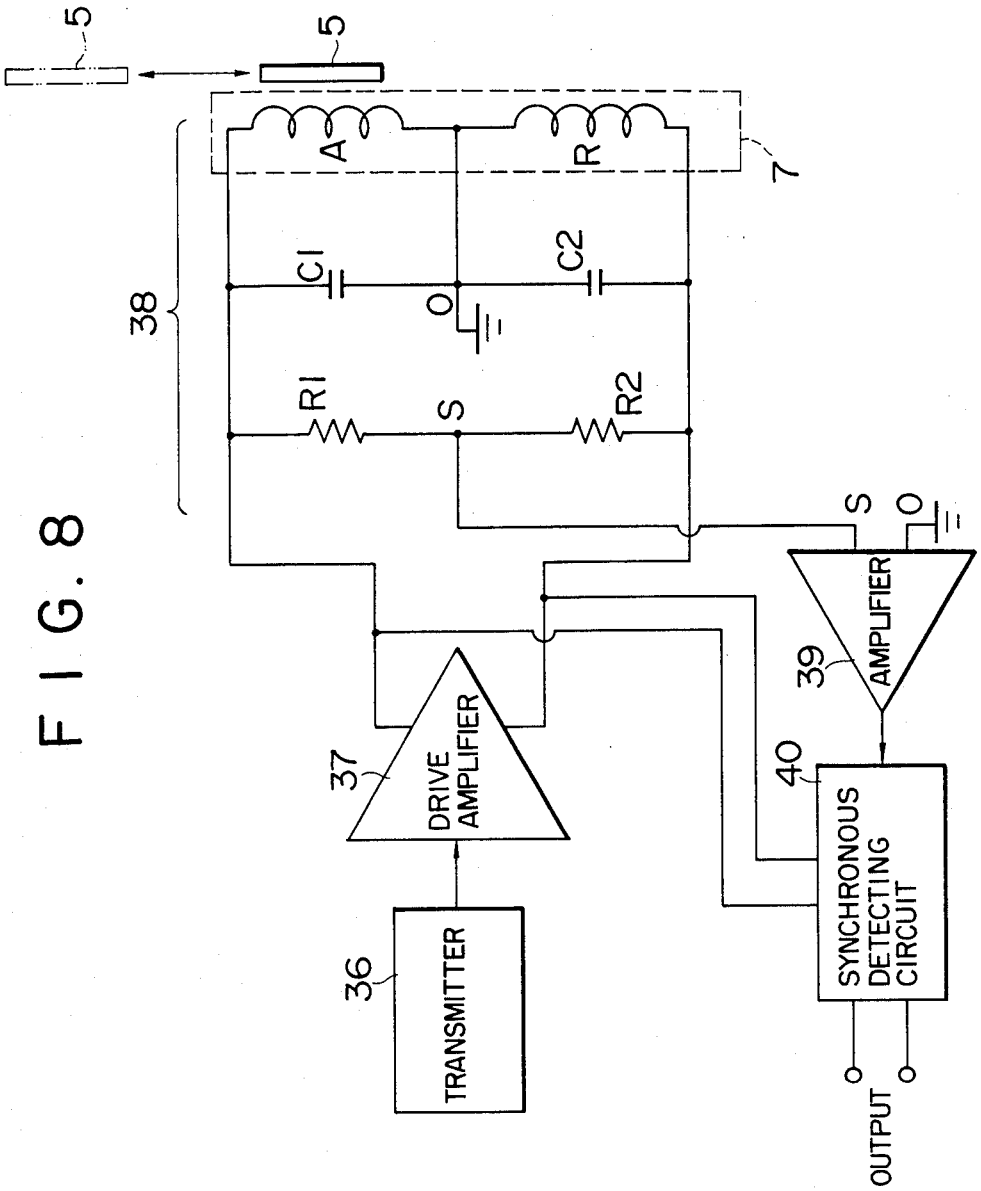
F I G. 8

HIGH TEMPERATURE FLUID FLOW SPEED DETECTION APPARATUS

BACKGROUND OF THE INVENTION

1. Field of the Invention

This invention relates to an apparatus for detecting the flow speed of a high temperature fluid, which may be used to make a survey for determining the strata, from which petroleum, gas, hot water or steam is produced from a petroleum well or a geothermal well and also determining the estimated amount of production.

2. Description of the Prior Art

A prior art flow speed detection apparatus used for the survey noted above in a well, has a construction as shown in FIG. 14. It comprises a rotary shaft 2 having a helical rotary blade 1 secured thereto. The shaft 2 is rotatable supported by bearings 8 and 9 in a fluid passage 4 defined in a casing 3 and extends in the longitudinal direction of the passage 4. A rotor 10 is secured to the shaft 2, and a switch control permanent magnet 11 is secured to the rotor 10 at an eccentric portion. A switch holder 12 is accommodated in and secured to the casing 3 and carries flow speed detection lead switches 13 which are controlled by the permanent magnet 11.

With the above prior art flow speed detection apparatus, when the permanent magnet 11 and lead switches 13 are heated by a high temperature fluid to a temperature in excess of 260° C., for instance, the magnetization of the permanent magnet 11 is reduced, and also the characteristics of the lead switches 13 are deteriorated. Consequently, the operation of the lead switches 13 for flow speed detection becomes instable, so that it is difficult to make an accurate measurement of the flow speed of the high temperature fluid (e.g., steam at 260° C. or above) in a well.

SUMMARY OF THE INVENTION

It is a first object of the present invention to permit accurate detection of the flow speed of a high temperature fluid with a structure, which comprises a casing, a rotary shaft with a rotary blade secured thereto and rotatably supported in and extending in the longitudinal direction of a fluid passage in the casing, a sensor control rotor secured to the rotary shaft and having targets provided on the outer periphery, and an eddy currents displacement transducer for flow speed detection and capable of withstanding a high temperature, the displacement transducer being disposed in and secured to the casing and controlled by the targets.

It is a second object of the present invention to provide a structure, which permits detection of the flow of the fluid as well by constructing the sensor control rotor such that it consists of a disk and a plurality of sawtooth-shaped targets provided on the outer periphery of the disk.

The other objects and features of the invention will become apparent from the following description of preferred embodiments of the invention with reference to the accompanying drawings.

BRIEF DESCRIPTION OF THE DRAWINGS

FIGS. 1 to 8 illustrate a first embodiment of the present invention, in which:

FIG. 1 is a longitudinal sectional view of a high temperature fluid flow speed detection apparatus;

FIGS. 2 and 3 are fragmentary enlarged-scale longitudinal sectional views showing the apparatus of FIG. 1;

FIG. 4 is a sectional view taken along line IV—IV in FIG. 2;

FIG. 5 is a sectional view taken along line V—V in FIG. 2;

FIG. 6 is a sectional view taken along line VI—VI in FIG. 2;

FIG. 7 is a sectional view taken along line VII—VII in FIG. 3; and

FIG. 8 is a schematic representation of an electric circuit connected to an eddy currents displacement transducer;

FIGS. 10 to 13 illustrate a second embodiment of the present invention, in which:

FIG. 10 is a longitudinal sectional view showing the high temperature fluid flow speed detection apparatus;

FIG. 11 is a sectional view taken along line XI—XI in FIG. 10;

FIG. 12 is a perspective view showing a sensor control rotor; and

DETAILED DESCRIPTION OF THE PREFERRED EMBODIMENTS

Figure 1:
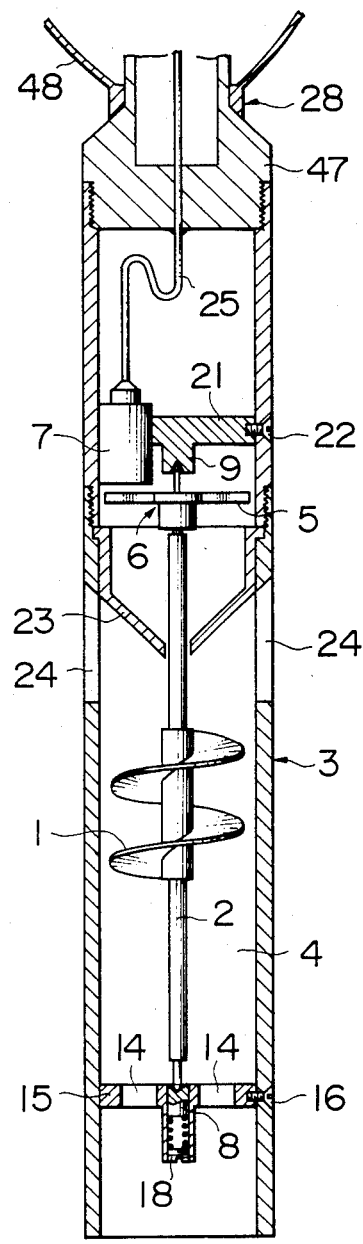

FIGS. 1 to 8 illustrate a first embodiment of the high temperature fluid flow speed detection apparatus according to the present invention. A rotary shaft 2 with a helical rotary blade 1 secured to an intermediate portion is coaxially disposed in a cylindrical casing 3. A bearing holder 15 having a plurality of radially spaced-apart fluid holes 14 is fitted in and secured by a screw 16 to a lower portion of the casing 3. A pivot bearing 8, which supports the lower end of the shaft 2, is slidably fitted in a central hole of the bearing holder 15, and a retainer lid 18 is screwed in the pivot bearing 8. A bearing support spring 19 is provided between the retainer lid 18 and the pivot bearing 8. A holding member 21 having an integral pivot bearing 9 is fitted in and secured by a screw 22 to an upper portion of the casing 3. The upper end of the shaft 2 is supported by the pivot bearing 9.

A flow guide member 23 having a conical portion is fitted in the casing 3 between the rotary blade 1 and the holding member 21. A portion of the casing 3 between the rotary blade 1 and the flow guide member 23 is formed with a plurality of fluid outlets 24. The upper edge of each fluid outlet 24 extends along an extension surface of the conical portion of the flow guide member 23. A fluid passage 4 is defined in the casing 3 below the flow guide member 23.

Figure 2:
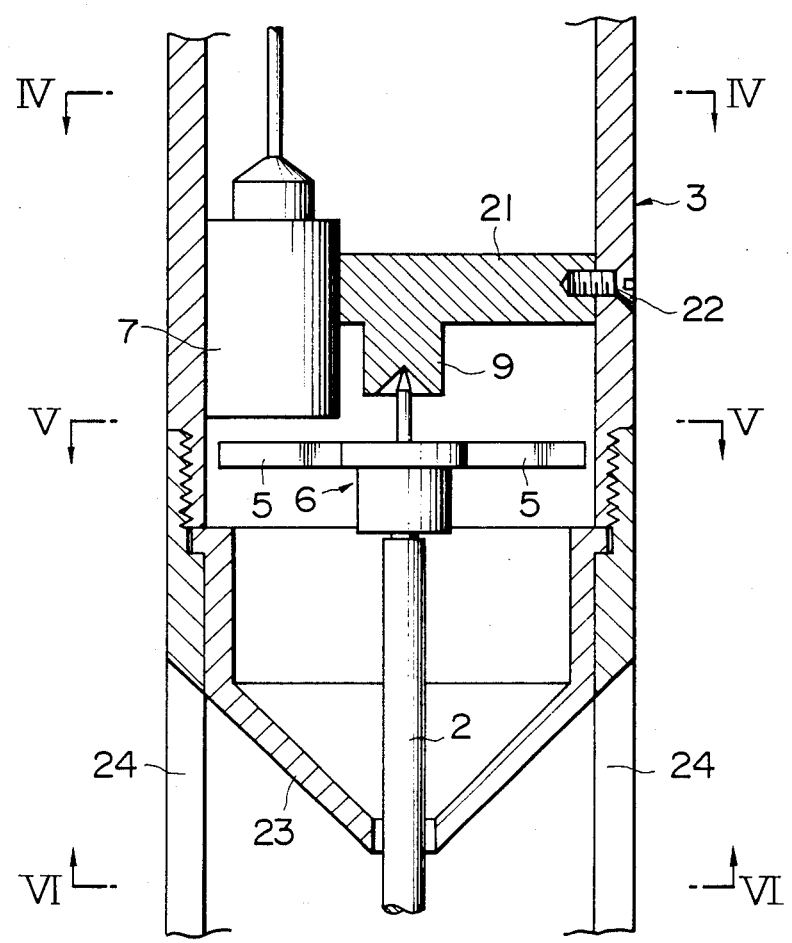
Figure 3:
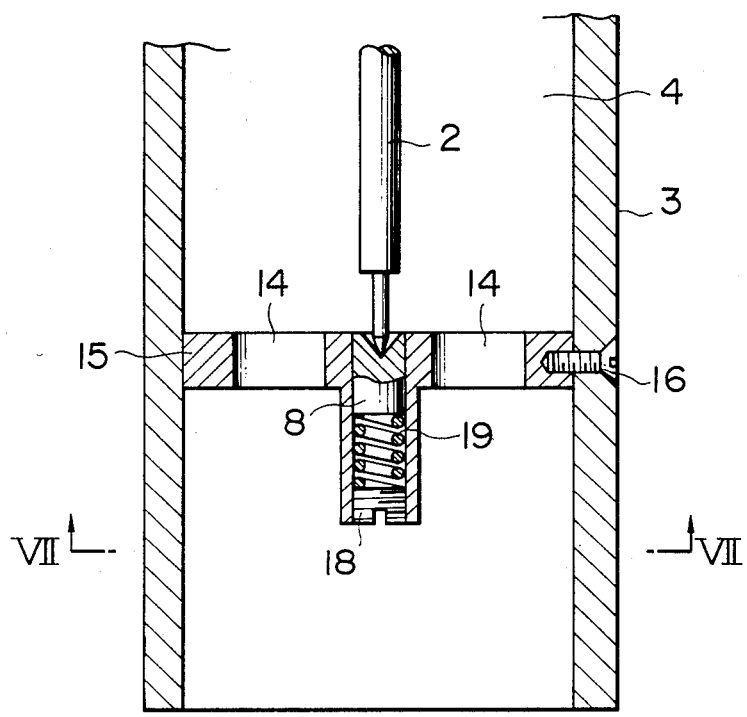
Figure 4:
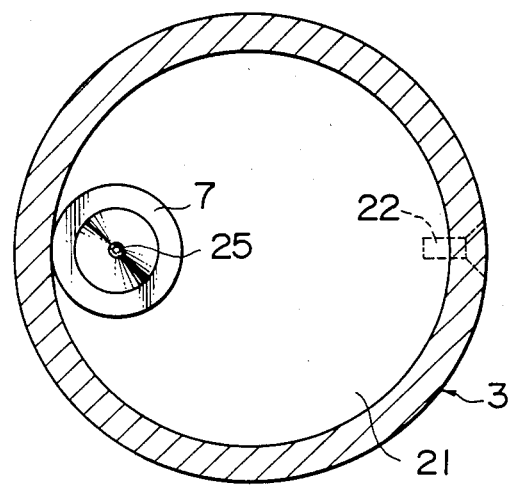
Figure 5:
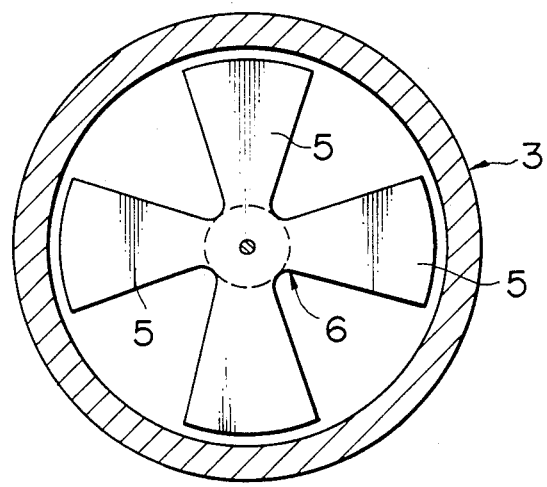
Figure 6:
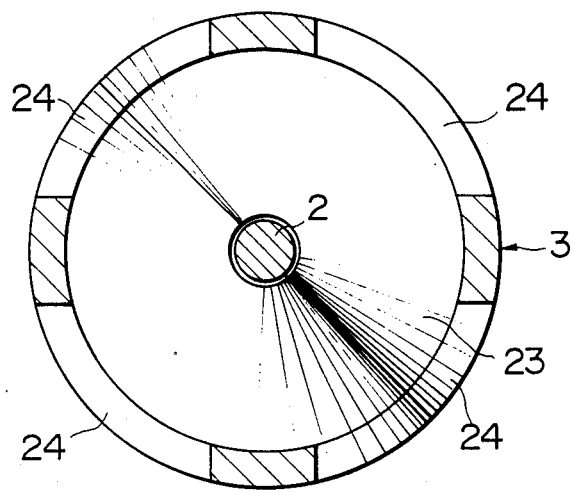
Figure 7:
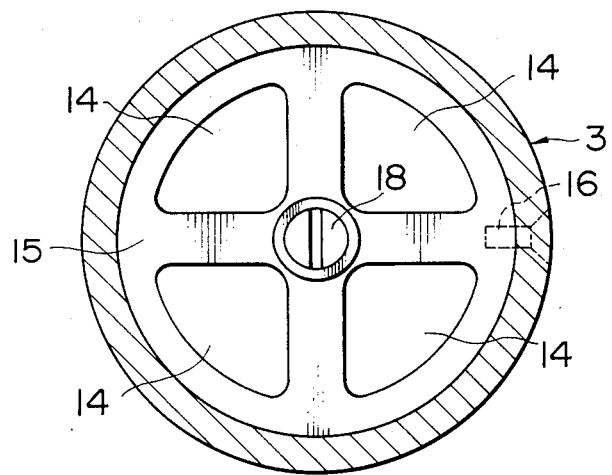

There is a sensor control rotor 6 and a target 5. The target 5 is made of a ferro-magnetic metal and has a plurality of (four in the illustrated case) members radially uniformily spaced apart. The rotor 6 and the target 5 are secured to the shaft 2 between the holding member 21 and the flow guide member 23. As shown in FIG. 2, an eddy currents displacement transducer 7 sealed in a case for flow speed detection penetrates the holding member 21 and is secured to an eccentric portion of the holding member 21. The transducer 7 is connected by a lead 25 to an electric circuit. The lead 25 consists of a tube made of a metal, e.g., stainless steel, a plurality of conductors accommodated in the tube and an insulator, e.g., magnesium oxide powder, filling the interstices between the conductors in the tube.

FIG. 8 shows an electric circuit which is connected to the eddy currents displacement transducer. Shown enclosed by a dashed line is the eddy currents displacement transducer 7. The eddy currents displacement transducer 7 includes two coils A and R connected in series. The coils A and R are provided with ceramic coating in order to be able to withstand a high temperature, e.g., 595° C.

Figure 9:
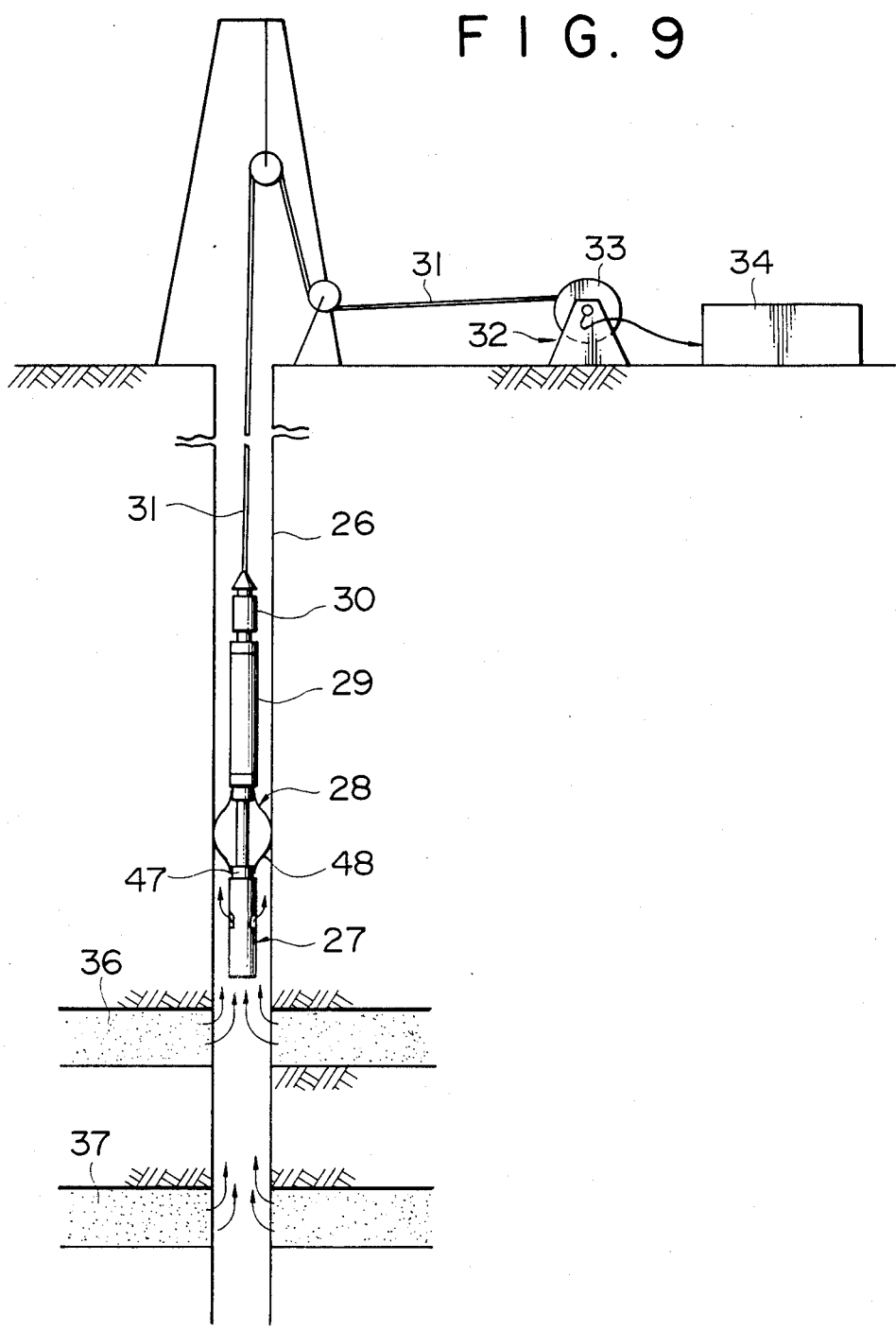
FIG. 9 is a side view showing an example of use of the flow speed detection apparatus according to the present invention.
Figure 10:
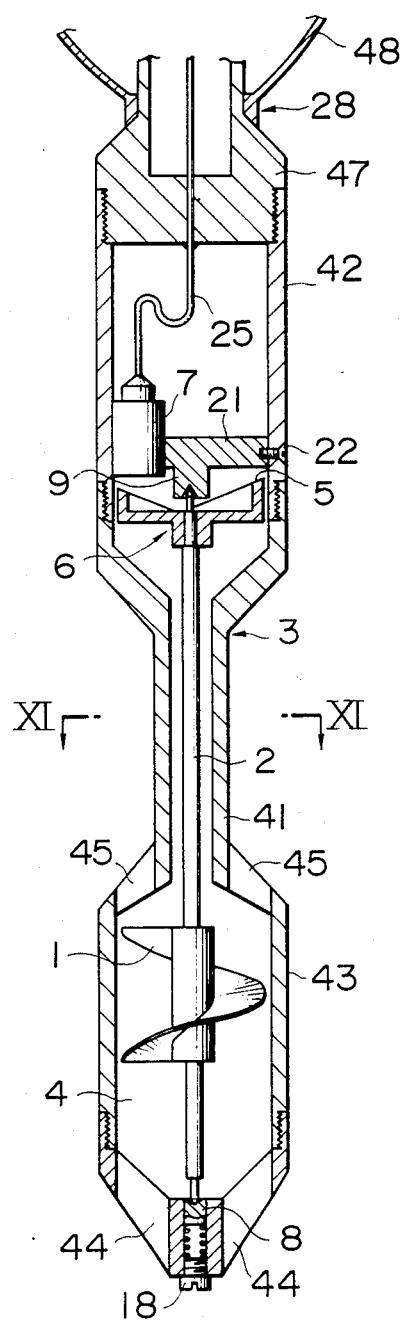
Figure 11:
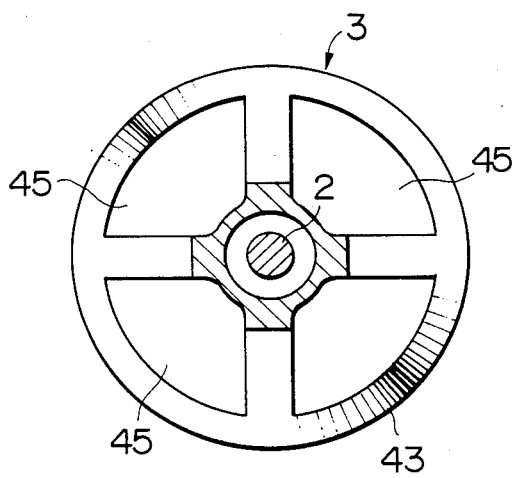
Figure 12:
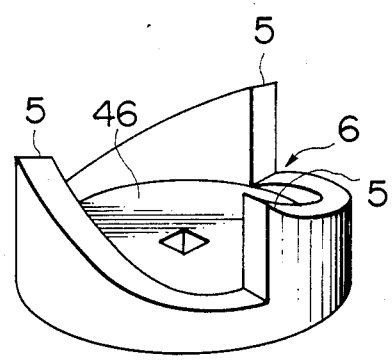

FIG. 9 shows the high temperature fluid flow speed detection apparatus in use for the measurement of the flow speed of the high temperature fluid in a well, e.g., a petroleum well, a gas well, a hot water well, a steam well, etc. The casing 3 of a flow speed detection apparatus 27 is disposed in a well 26. The top of the casing 3 is connected to the lower end of a shaft 47 of a center holder 28, which consists of the shaft 47 and a plurality of arcular springs 48 mounted on the outer periphery of the shaft 47. An electric circuit accommodation cylindrical casing 29, a cable head 30 and a cable 31 are connected in the mentioned order to the top of the shaft 47. The cable 31 is wound on a drum 33 of a winch 32 provided on the ground. One end of the cable 31 is connected by way of a relay brush (not shown) provided on a drum shaft to a recorder 34 provided on the ground. The electric circuit which is connected to eddy currents displacement transducer 7, i.e., the signal currents displacement transducer 7 shown in FIG. 8 is accommodated in a heat-insulated caseprovided in the electric circuit accommodation cylindrical casing 29.

The periphery of the metal tube of lead 25 is secured by means of welding to the shaft 47 of the center holder 28. lead 25 and shaft 47 are sealed with respect to each other.

Referring to FIG. 9, reference numeral 136 and 137 designate layers in the well 26, from which petroleum, gas, hot water, steam, etc. is produced. The operation of the circuit shown in FIG. 8 will now be described. An AC current is caused to flow from a 50 kHz transmitter through a drive amplifier 37 to an impedance bridge 38, which consists of the currents displacement transducer 7, external resistors R1 and R2, with midpoint S and capacitors C1 and C2 and coils A and R with a midpoint O.

When the fluid flows upward through the fluid passage 4 so that the rotary shaft 2 and the sensor control rotor 6 and the targets 5 in the sensor control rotor 6 are rotated so that the targets 5 are displaced in front of the coil A in the eddy currents displacement transducer 7, so that the impedance of coil A is changed. With this change in the impedance a signal voltage between S and O is also changed. This slight change in the signal voltage is amplified by an amplifier 39 and detected by a synchronous detecting circuit 40. Only a displacement signal is taken out in this way, and it is fed as a pulse signal through the cable head 30 and cable 31 to the recorder 34 provided on the ground to be recorded as flow speed data.

FIGS. 10 to 13 illustrate a second embodiment of the present invention. In this instance, the casing 3 consists of an intermediate small diameter portion 41 and upper and lower large diameter portions 42 and 43. The rotary blade 1 secured to the rotary shaft 2 is disposed in the lower large diameter portion 43. The lower large diameter portion 43 is provided at the opposite ends with fluid passage holes 44 and 45. The sensor control rotor 6, eddy currents displacement transducer 7 for flow speed detection and holding member 21 are disposed in the upper large diameter portion 42. The sensor control rotor 6 consists of a disk 46 and a plurality of sawtooth-shaped targets 5 provided on the outer periphery of the disk 46. The rest of the construction is the same as in the case of the first embodiment.

Figure 13A:
FIGS. 13(A) and 13(B) are views showing detected waveforms.
Figure 13B:
Figure 14:
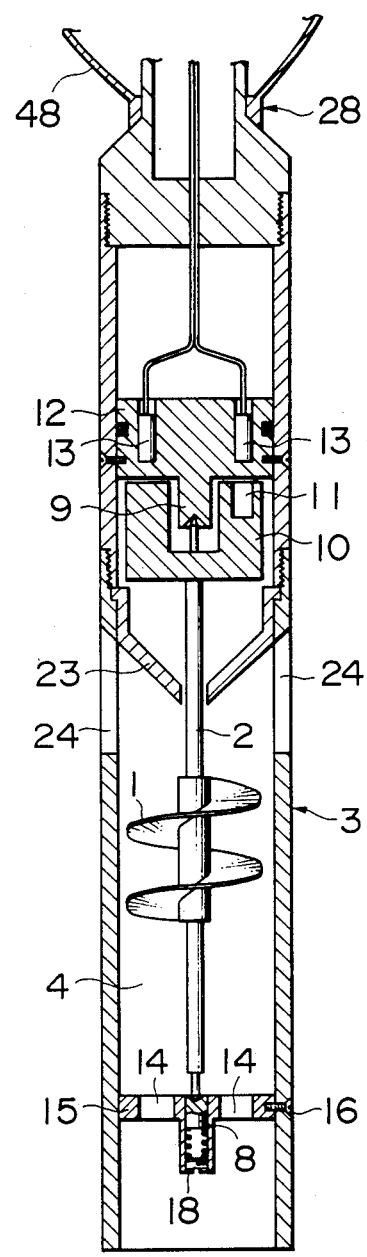
FIG. 14 is a longitudinal sectional view showing a prior art flow speed detection apparatus.

In the case of the second embodiment, when the fluid flows upwards through the fluid passage 4, a sawtooth-shaped waveform as shown in FIG. 13(A) is detected. When the fluid flows through the fluid passage 4 downwards, a reverse sawtooth-shaped waveform as shown in FIG. 13(B) is detected. In the case of the second embodiment, it is also possible to detect the direction of flow of the fluid.

What is claimed is:

1. A high temperature fluid flow speed detection apparatus, comprising in combination:
   (1) an elongated casing (3), designed to be disposed vertically in a borehole, having fluid therein, said casing (3) defining a longitudinal fluid-flow passage (4), said casing (3) extending from a shaft (47) which in turn is held in place by a center holder (28);
   (2) a rotary shaft (2) extending in the longitudinal direction of said fluid-flow passage (4), with a helical rotary blade (1) secured thereto;
   (3) a sensor control rotor (6) secured to said rotary shaft (2) and having a plurality of metal targets (5) on the outer periphery;
   (4) an eddy currents displacement transducer (7) sealed in the casing and disposed so as to be opposed to said targets, said eddy currents displacement transducer (7) including a coil (A) having an impedance;
   (5) a lead (25) connected to said eddy currents displacement transducer (7) consisting of a stainless steel tube, said tube having an outer periphery, a plurality of conductors accomodated within said tube, and, magnesium oxide powder insulator means filling in the interstices between conductors within said tube, the outer periphery of said tube being secured to said shaft (47); and,
   (6) electric circuit means for detecting a change in the impedance of the coil (A) due to the displacement of said targets into which eddy currents flow, said coil then producing an electrical signal, changing at a rate in proportion to the revolution frequency of said targets.

2. A high temperature fluid flow speed detection apparatus according to claim 1, wherein said sensor control rotor (6) consists of a disc (46) and a plurality of saw-toothed targets (5) made of metal and provided on the outer periphery of said disc.

3. A high temperature fluid flow speed detection apparatus according to claim 1, including additional electric circuit means for producing an electrical signal changing at a rate in proportion to the revolutional frequency of said target, consisting of a transmitter (36), feeding activating power, a drive amplifier (37) disposed for receiving the output of said transmitter (36), an impedance bridge (38) connected to said coil (A), said impedance bridge (38) being fed by said drive amplifier, a second amplifier (39) fed by said impedance bridge (38), and a synchronous detecting circuit (40) fed by said second amplifier (39).

* * * * *